United States Patent [19]

Herbstein et al.

[11] 3,903,414

[45] Sept. 2, 1975

[54] TRIPLE-MODE SPECTRODIFFRACTOMETER FOR MEASURING DIFFRACTION, FLUORESCENCE, AND ABSORPTION ON A SINGLE INSTRUMENT

[75] Inventors: Frank H. Herbstein; Ammon Levy, both of Haifa, Israel

[73] Assignee: Technion Research & Development Foundation Ltd., Haifa, Israel

[22] Filed: Feb. 20, 1974

[21] Appl. No.: 443,992

[30] Foreign Application Priority Data
Feb. 20, 1973 Israel.................................... 41592

[52] U.S. Cl............................... 250/272; 250/278
[51] Int. Cl.²....................................... G01N 23/20
[58] Field of Search .......... 250/272, 273, 277, 278, 250/358, 491

[56] References Cited
UNITED STATES PATENTS

| | | | |
|---|---|---|---|
| 3,124,681 | 3/1964 | Zingaro............................. | 250/278 |
| 3,340,397 | 9/1967 | Johnston........................... | 250/491 |
| 3,576,993 | 5/1971 | Hagg................................. | 250/278 |

*Primary Examiner*—Davis L. Willis
*Attorney, Agent, or Firm*—Browdy and Neimark

[57] ABSTRACT

A spectrodiffractometer for performing X-ray diffraction, fluorescence and absorption analyses using a single standard X-ray diffraction tube. By simple adjustments, the apparatus may be changed from a diffraction mode to a fluoroescence mode to an absorption mode without interchanging components or utilizing separate X-ray tubes.

8 Claims, 7 Drawing Figures

Fig. 7

TRIPLE-MODE SPECTRODIFFRACTOMER FOR MEASURING DIFFRACTION, FLUORESCENCE, AND ABSORBTION ON A SINGLE INSTRUMENT

FIELD OF THE INVENTION

This invention relates to a spectrodiffractometer for performing X-ray diffraction, fluorescence and absorption analysis.

BACKGROUND OF THE INVENTION

The diffraction of X-rays by solids is a well-known phenomenon conventionally used to carry out crystallographic analysis of crystalline matter. Apparatus for such analysis basically comprises a specimen holder carrying the crystalline sample under study which reflects an incident X-ray beam into a detector mounted with the holder for synchronized rotation about a common axis so that the detector turns through twice the angle of the holder. As is well known, the output of the detector is a series of peak-readings that occur at characteristic angles of the holder relative to the incident beam. The relative intensities of the peaks and their angular position identify the substance or substances in the specimen, and may be used to give information on the structure of the material such as the arrangement of the atoms, the stereochemistry or molecules, the interatomic distances, etc.

A non-destructive chemical analysis of a sample, on the other hand, can be obtained by means of its X-ray fluorescence. Apparatus of this purpose usually comprises a specimen holder containing, in powdered form, the sample under study which is arranged in the path of an incident X-ray beam so that secondary X-rays produced by the sample are incident on an analysing crystal mounted on a holder, and a detector for receiving X-rays reflected by the crystal. The crystal holder and the detector are mounted for synchronized rotation about a common axis so that the detector turns through twice the angle of the holder. As a consequence, the output of the detector is a series of peak readings that occur at characteristic angles of the holder whereby each of the elements in the sample under study can be identified.

Another method employing X-rays for chemical analysis depends on the absorption of X-rays of appropriate wavelengths by the various elements in the sample. In this method X-rays of different wavelengths are obtained by reflection from a crystal, or by the fluorescence of an appropriate source, and their absorption in the sample is measured by a radiation detector.

All of the above described techniques are widely used for analysis and teaching purposes. Generally, a separate piece of equipment is required to carry out each type of study. In an effort to simplify the apparatus by taking advantage of the synchronized rotation between the specimen holder and the detector, which is a common feature in both diffraction and fluorescence techniques, a spectrodiffractometer has been proposed in which the specimen chamber is mounted on dual support next to the X-ray diffraction tube and directly supports an X-ray fluorescent tube in a vertical position. The advantage of this construction is that the need for interchanging components when changing techniques is eliminated saving considerable time. In addition, the need to realign the system for diffraction studies is eliminated. The deficiency with this approach lies in the need for utilizing a separate X-ray tube for each of the two techniques. As a consequence, the spectrodiffractometer of the prior art is quite complex and is very expensive precluding its use as a teaching aid.

SUMMARY OF THE INVENTION

It is therefore an object of the present invention to provide a new and improved spectrodiffractometer which is simpler and less complicated than spectrodiffractometers of the prior art and which is capable of operating with a single X-ray source.

According to the present invention there is provided a spectrodiffractometer for performing X-ray diffraction, fluorescence and absorption analysis using a standard X-ray diffraction tube having a shutter protected window comprising a housing defining a specimen chamber within which is rotatably mounted a main specimen holder adapted to hold a crystal for reflecting incident X-rays into an output port whose axis intersects the axis of rotation of the specimen holder and which is mounted on the housing for rotation about the axis of the specimen holder, means interconnecting the main specimen holder and the output port for synchronizing the rotation therebetween so that the output port turns through twice the angle of the holder, a pair of X-ray ports in the housing whose axes are quadrantly located in the same plane as the plane of rotation of the axis of the output port and intersect at the axis of rotation of the main specimen holder, an extension constituting a first X-ray input port connected with one of the pair of X-ray ports by an auxiliary specimen holder and having an axis projecting in the same direction as and parallel to the other of the pair of X-ray ports which constitutes a second X-ray input port, and means mounting the housing on a frame carrying the X-ray tube such that the axis of either the first or second X-ray input port can be positioned in alignment with the X-ray beam passing through the window of the tube depending on the position of the housing on the frame.

By providing for the selective adjustment of the main specimen holder on the housing to change the angular position of the holder relative to the output port, the main specimen holder can be rotated through 180° in order to convert the apparatus from its diffraction mode to its fluorescence mode of operation. When in the diffraction mode of operation, the upper X-ray port is aligned with X-ray beam; the angular scale of the detector has its zero at the X-ray beam exit position and proceeds counter-clockwise circumferentially to a detector angle of 90°. The main specimen holder, facing upwards, holds a single-crystal or polycrystalline specimen which diffracts incident X-rays into the detector. In the fluorescence mode of operation, the spectrodiffractometer is moved upwards relative to the (fixed) X-ray beam, which now enters the apparatus through the lower X-ray port and illuminates a specimen inclined to the input beam at about 45°, so that fluorescent (secondary) X-rays are emitted upwards towards the specimen holder. This holds an analyzing crystal in the form of a flat plate and is turned 180° with respect to its position in the diffraction mode. The analyzing crystal diffracts fluorescent X-rays into the detector, whose angular range now runs from 0° (vertical) in a clockwise direction to 90° (horizontal). In both these modes of operation the detector moves at twice the angular velocity of the sample (analyzing crystal) holder. In the absorption mode, a suitable wavelength is chosen by setting the sample holder (containing preferably a single crystal specimen) in the diffraction mode to an appropriate angle; the absorbing material, usually in the form of a thin foil of known thickness, can be interposed in front of the detector and absorption is determined by making intensity measurements with and without the sample in place. Alternatively the required wavelength can be obtained in the fluorescent mode by using an appropriate combination of fluorescing sample and analyzer-crystal angle, and proceeding as above for diffraction-mode selection of wavelength. Thus the simple adjustments of the apparatus described above permit conversion from one mode of operation to another utilizing a single X-ray tube in a fixed position.

In the preferred embodiment of the present invention safety interlocks provide full radiation protection for the operator; and adjustments from one mode of operation to another can be made under conditions in which the primary X-ray beam is effectively closed off even though the X-ray tube continues to operate. The importance of these features lies in speeding up of chemical and physical analyses in the laboratory and in the usefulness of the apparatus for teaching purposes i.e., in demonstrating fundamental principles in atomic structure (generation and absorption of X-rays), crystal structure analysis (diffraction effects) and chemical analysis (crystal analysis by powder diffraction and elemental analysis by X-ray fluorescence and absorption). The design of the apparatus is such that it is inexpensive, and safe enough for students to use in their own experimental work in the undergraduate laboratory.

BRIEF DESCRIPTION OF THE DRAWINGS

An embodiment of the invention is illustrated by way of example in the accompanying drawings, wherein.

DESCRIPTION OF PREFERRED EMBODIMENTS

Figure 1:
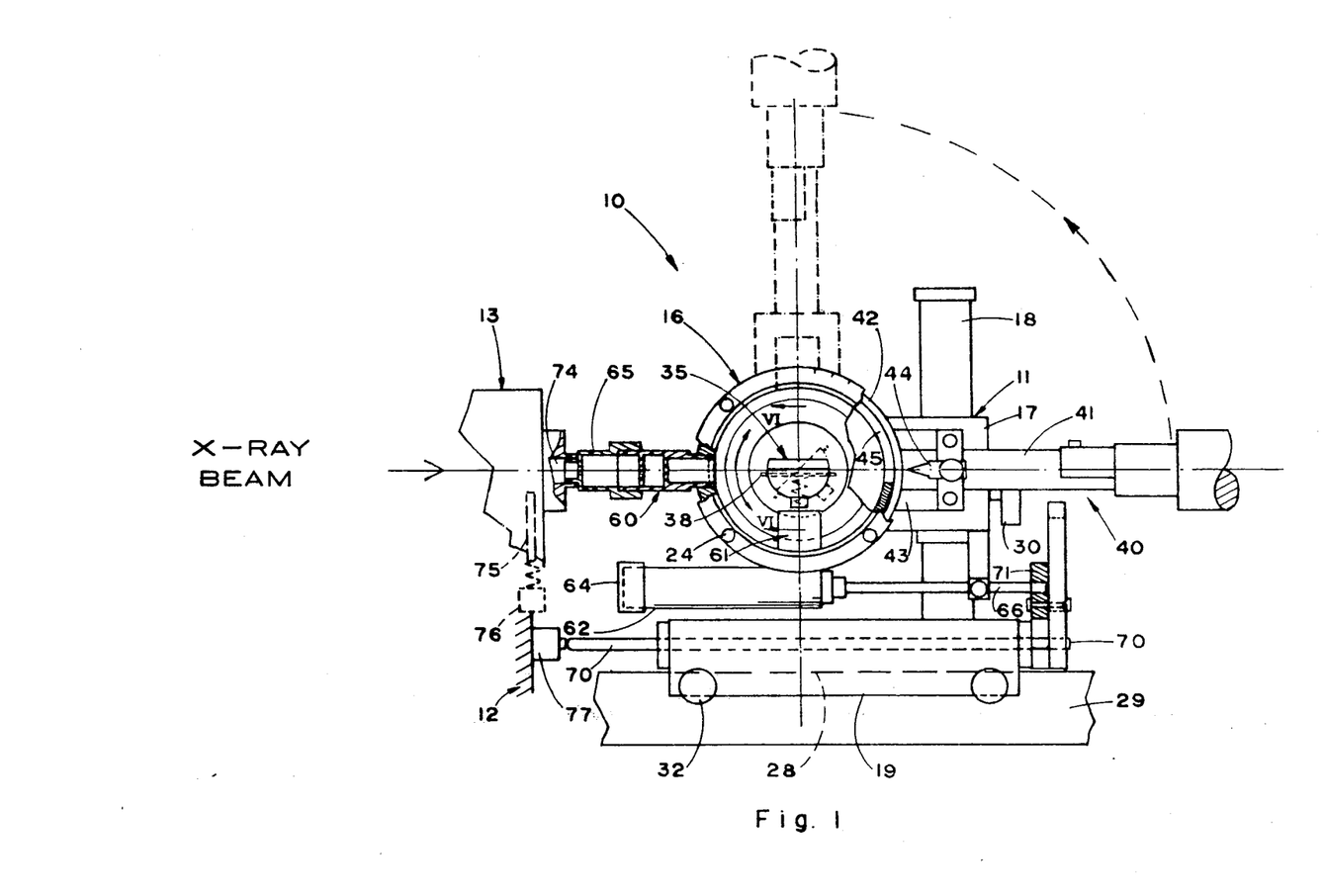
FIG. 1 is a side view of the apparatus according to the present invention showing it in its diffraction mode of operation.
Figure 2:
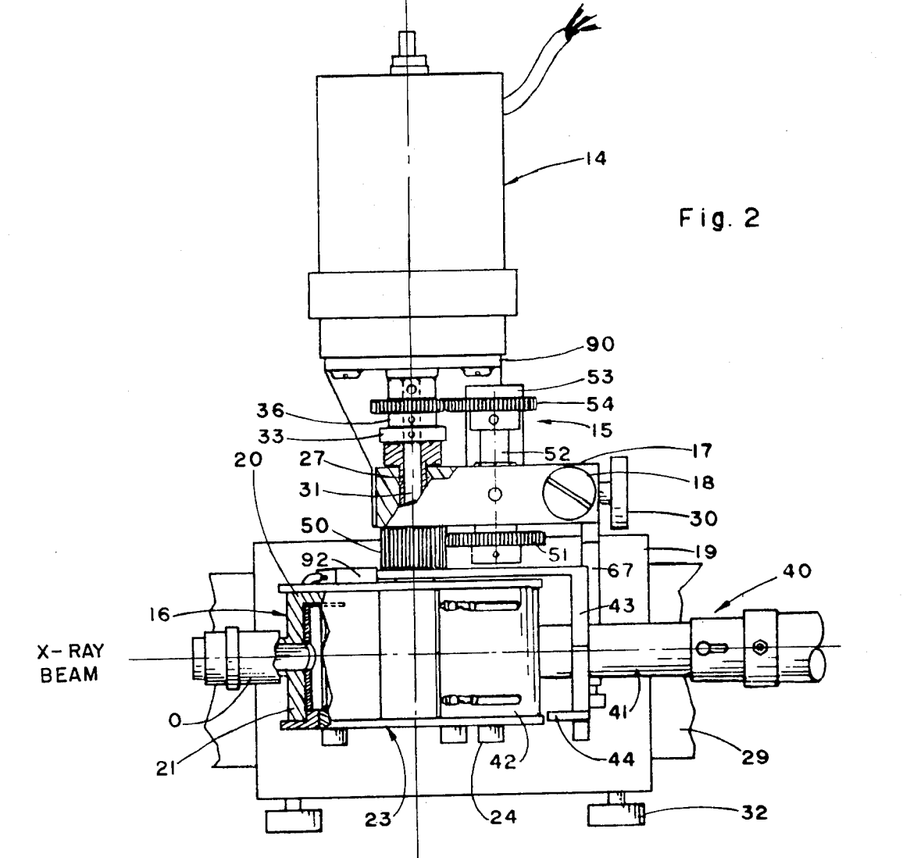
FIG. 2 is a top view of the spectrodiffractometer shown in FIG. 1.

Referring now to FIG. 1, reference numeral 10 designates a spectrodiffractometer according to the present invention comprising a housing 11 supported on a frame 12 that is part of an X-ray diffraction tube structure 13 described below and a reversible, motorized speed reducer 14 connected to the housing through a gear arrangement 15 (see FIG. 2).

Housing 11 includes a cup member 16, bracket 17, rod 18 and base 19. Member 16 has a base 20 (see FIG. 3) to which is attached a cylindrical wall 21, which, with the base 20, defines a specimen chamber 22. Access to the specimen chamber is achieved by removing cover plate 23 which is attached to the end of wall 21 opposite base 20 by a plurality of screws 24. Preferably, cover plate 23 includes a flanged ring of metal 25 that nests within the walls 21 of the cup member as shown in FIG. 2, and a lead glass disc 26 fixed within the ring 25 (see FIG. 3).

Figures 6, 7:
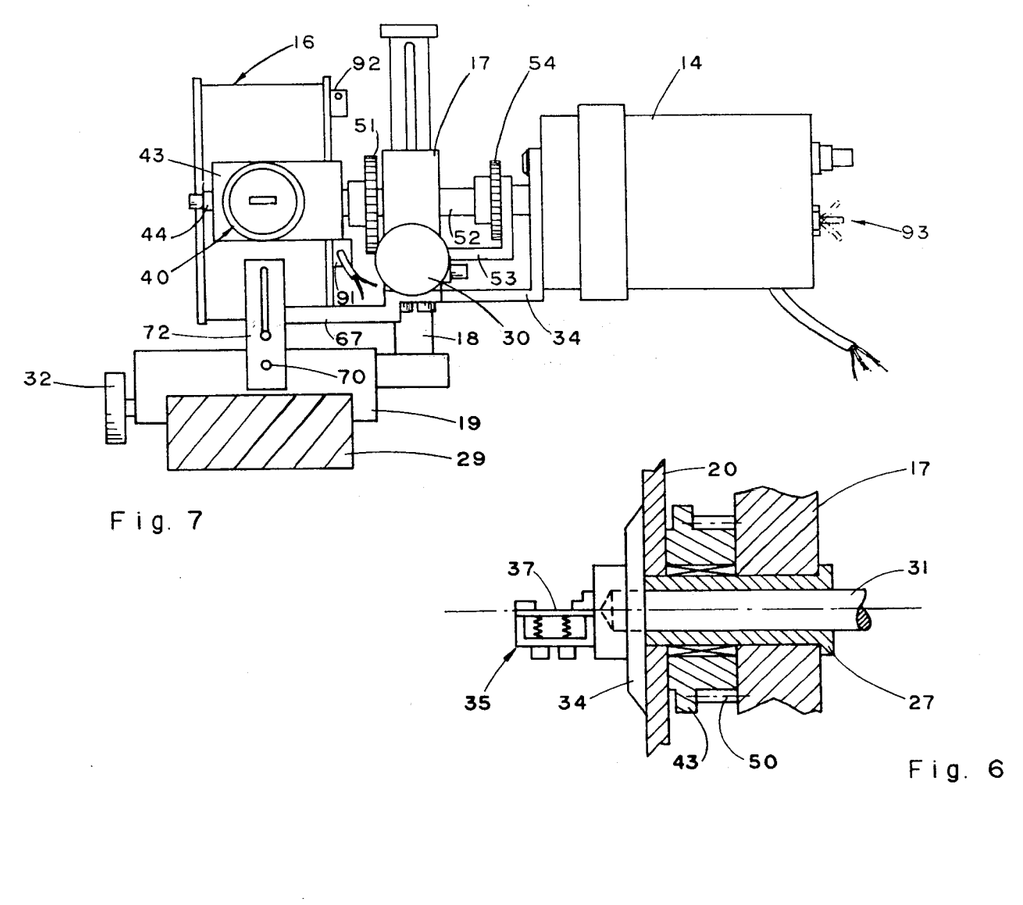
FIG. 6 is a sectional view taken along the line VI—VI of FIG. 1.
FIG. 7 is a side view of the apparatus shown in FIG. 1.

Cup member 16 is supported in cantilever fashion from bracket 17 by means of tube 27, one end of which is rigidly fixed to the bracket and the other end of which is rigidly fixed to base 20 of cup member 16 as shown in FIG. 6. Bracket 17 slidably receives vertical rod 18 that is fixedly secured to base 19 whose underside carries a longitudinal groove 28 that slidably receives horizontal way 29 of frame 12. Manually operated thumb screw 30 passing through bracket 17 and into engagement with a vertical slot in rod 18 provides for the positioning of bracket 17 and the cup member 16 at the desired elevation on the rod appropriate, respectively, to the diffraction and fluorescence modes of operation.

Rotatably journalled within tube 27 is shaft 31, the inner free end of which projects into the specimen chamber 22 in cup member 16 and the outer portion of which projects beyond the tube and carries thumb wheel 33 rigidly attached thereto. The free end of the outer portion of shaft 31 is frictionally received in the bore of output gear 36 rigidly fixed to the output shaft of motor 14 which is mounted on angular bracket 90 attached to the underside of bracket 17. The frictional coupling between shaft 31 and gear 36 is such that when motor 14 is energized, shaft 31 is rotated through the same angle as gear 36. However, when motor 14 is not energised, manual rotation of wheel 33 will overcome the frictional coupling and permit the angular position of shaft 31 to be adjusted independently of the angular position of gear 36. A set-screw in the hub of gear 36 may be provided to key shaft 31 to the gear 36 after the angular position of shaft 31 has been properly selected.

Rigidly attached to the free inner end of shaft 31 is dial disc 34 that overlies base 20 (see FIG. 6) and which may have indicia on its outer peripheral bevelled edge cooperable with a mark on the base 20 such that the angular position of shaft 31 can be established by the relationship between the mark and the indicia. Disc 34 carries the main specimen holder 35 which is conventional and is designed to hold a single crystal specimen or analyzer mounted on a substrate, or a polycrystalline specimen in a suitable holder. Holder 35 thus includes a pair of axially spaced supports carrying a slidable base 37 that is spring biased toward a pair of stops on the support. The crystal to be studied or used as an analyzer is thus mounted on the holder by capturing the substrate between the support 37 and the stops thus positioning the crystal so that the axis of rotation of shaft 31 passes through the crystal in a direction parallel to a planar face thereof. By reason of the above described construction, the angular position of the crystal can be established either by manual rotation of thumb wheel 33 or by energising motor 14. The above and following descriptions are applicable to the single-crystal situation, but similar methods are used for diffraction analyses of polycrystalline samples.

When the angular position of shaft 31 is proper, X-rays incident on a crystal mounted on holder 35 and passing in a direction perpendicular to the axis of rotation of shaft 31 will be reflected by the crystal into an output port 40 whose axis is perpendicular to the axis of rotation of shaft 31 and intersects such axis within the body of the crystal. Port 40 comprises a tube 41 attached at one end to an arcuate segment 42 that is slidably mounted on the outer peripheral surface of housing 16 (see FIG. 1). Tube 41 is attached intermediate its ends to an L-shaped bracket 43 (see FIG. 2) that passes behind cup member 13 and is rotatably supported on tube 27. Thus, tube 41 is rotatably mounted about the axis of shaft 31. A pointer 44 on bracket 43 cooperates with suitable indicia provided on ring 25 of cover 23 when the latter is in place on the cup. In this manner, the angular position of the output port can be observed. A 90° slot 45 is provided in the wall 21 of cup 16 aligned with the plane defined by the axis of port 40 when the latter rotates about the axis of shaft 31. Segment 42 serves to provide cover for the slot 45 regardless of the angular position of the outlet port 40.

Adjacent the free end of tube 41 is a transverse slot 46 (see FIG. 5) of a width sufficient to receive a specimen sheet or metallic film. Slot 46 is selectively opened or closed by sleeve 47 slidably mounted on the exterior of tube 41. Finally, the free end of this tube is provided with a coupling 48 by which a conventional detector, indicated generally by reference numeral 49, such as a Geiger counter can be attached.

Turning now to the coupling between the holder 35 and the output port 40, reference is again made to FIG. 2 which shows a pinion gear 50 coaxial with shaft 31 but rigidly secured to the L-shaped bracket 43 by which the output port 40 is mounted. Pinion 50 meshes with a larger transfer gear 51 which is rigidly secured at one end of countershaft 52 rotatably carried by a bearing in bracket 17 and by a bearing in extension bracket 53 connected to bracket 17. Adjacent bracket 53, shaft 52 carries a transfer gear 54 that meshes with and is the same size as the gear 36 driven by motor 14. The pitch diameter of gear 51 is twice the pitch diameter of pinion 50 such that the angular displacement of bracket 43 (and outlet port 40) is twice the angular displacement of gear 36 (and the angular displacement of holder 35). In this manner, the rotation between the specimen holder and the output port is synchronized so that the output port turns through twice the angle of the specimen holder.

The normal position of port 40 prior to the start of either a diffraction or a fluorescence study is shown by the solid lines of FIG. 1, normally horizontal. If toggle switch 93 is in its neutral position (shown in full line in FIG. 7), and is moved to its upper position, power will be applied to motor 14 rotating it in such a direction (forward, for reference purposes) that port 40 is driven CCW as seen in FIG. 1 from its position shown in full lines. At the completion of one pass, port 40 is essentially in the position shown in phantom lines in FIG. 1, namely approximately vertical. Now, if toggle switch 93 is in its neutral position and is moved to its lower position, power will be applied to motor 14 rotating it in such direction (reverse, for reference purposes) that part 40 is driven CW as seen in FIG. 1 from its position shown in phantom lines.

In view of the motor drive for port 40, it is important that means be provided for controlling the operation of motor 14 and preventing the movement of part 40 beyond its terminal limits. The preferred form of such means is a limit switch. A pair of limit switches 91 and 92 (FIG. 7) are therefore mounted on the base 20 of cup 16 in the path of movement of bracket 43. The engagement of this bracket with limit switch 91 (port 40 horizontal) opens the circuit by which switch 93 would normally be able to rotate motor 14 in the reverse direction, while the engagement of the bracket with limit switch 92 (part 40 vertical) opens the circuit by which switch 93 would normally be able to rotate motor 14 in the forward direction. Thus, motor 14 can drive the part 40 CCW as seen in FIG. 1 only until the part is vertical, and can drive the part CW as seen in FIG. 1 only until the part is horizontal.

Figure 5:
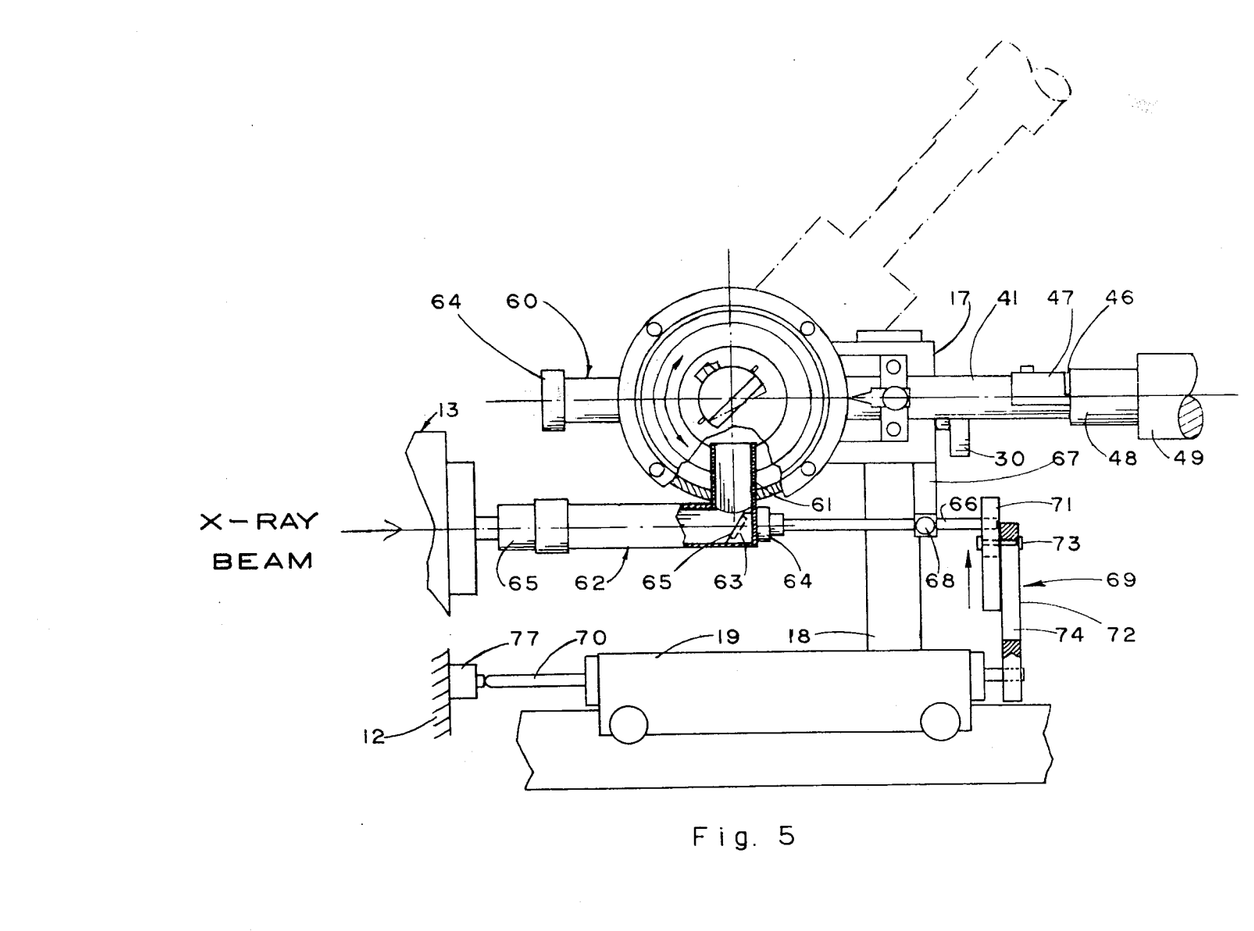
FIG. 5 is a side view of the spectrodiffractometer shown in FIG. 4 but showing the auxiliary specimen holder inserted in its operative position.

Turning now to the input to the spectrodiffractomer, there is rigidly attached to the cylindrical wall 21 of the cup 16, a pair of X-ray ports 60 and 61 whose axes are quadrantly located in the same plane as the plane of rotation of the axis of the output port 40 and intersect at the axis of rotation of shaft 31. As is shown in FIG. 5, an extension 62 is connected with port 61 by means of an auxiliary specimen holder 63. The axis of extension 62 projects in the same direction as and is parallel to port 60. For reference purposes, extension 62 constitutes a first X-ray input port, while port 60 constitutes a second X-ray input port. As shown in FIG. 1, the free ends of ports 60 and 62 terminate at the same distance from the vertical plane containing the axis of shaft 31. The diametral dimension of these ports are such that either a cap 64 or an adapter 65 can be attached to the free ends thereof.

As seen in FIG. 5, the end of extension 62 adjacent port 61 is open for the slidable reception of specimen holder 63 which comprises a closure plug 64 for closing the open end of extension 62, and a triangular shaped block 65 containing a depression within which a powdered specimen can be mounted when the spectrodiffractrometer is operated in its fluorescent mode.

Extending from the closure plug 64 in an axial direction is connection rod 66 which is slidably supported in extension bracket 67 attached to the underside of main bracket 17. A thumb wheel 68 in bracket 67 releasably holds rod 66 such that the specimen holder is positioned with the depression in the block 65 properly aligned to cause secondary fluorescent radiation from the elements in the specimen held in the depression to be directed upwardly along the axis of port 61.

Figure 4:
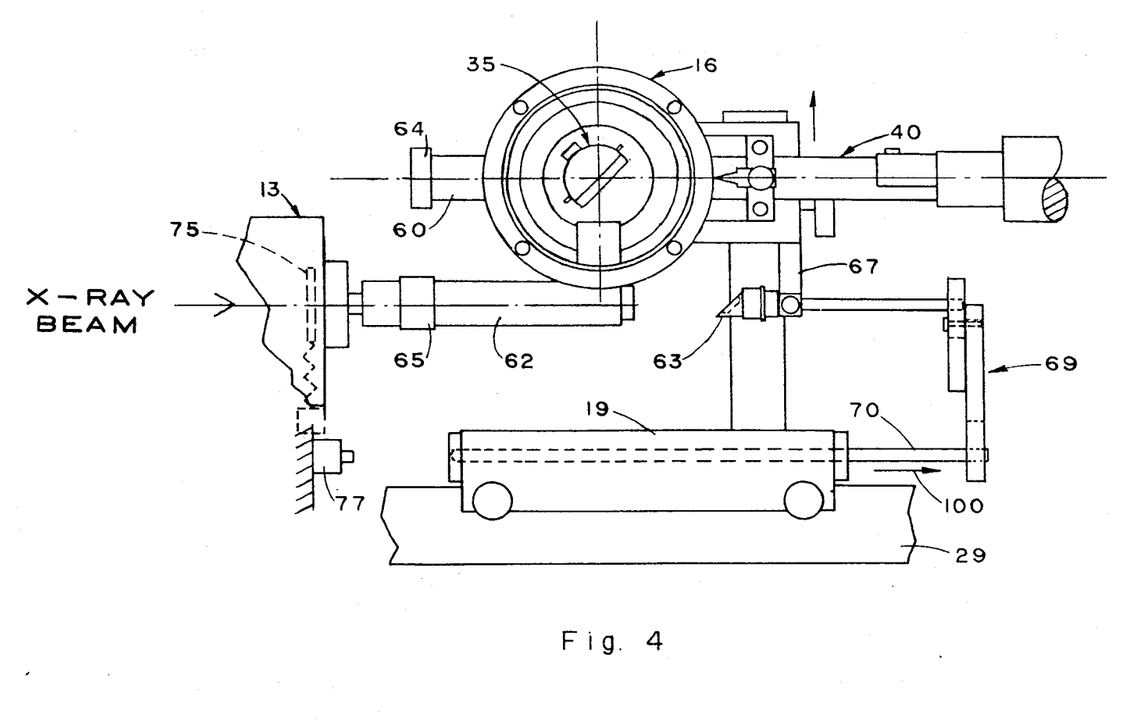
FIG. 4 is a side view of the spectrodiffractometer similar to the view of FIG. 1 except showing the instrument rigged for its fluorescence mode of operation and the auxiliary specimen holder removed.

At the free end of rod 66 is a connection mechanism 69 by which movement of the rod 66 to retract the specimen holder 63 from extension 62 is coupled to an operating arm 70 slidably mounted within base 19. Connection mechanism 69 comprises a pair of slidable plates 71 and 72 interconnected by a pin 73. One end of plate 71 is rigidly attached to the free end of rod 66 while the other end of this plate is provided with a centrally located slot that freely receives operating arm 70 as shown in FIG. 1. One end of plate 72 is rigidly connected to the operating arm 70 and is provided with a central slot 74 which slidably receives pin 73 attached to plate 71. As a consequence of this construction, the cup 16 is free to move vertically on rod 18 without disturbing the axial position of operating arm 70, while the axial displacement of rod 66 to withdraw the specimen holder 63 from extension 62 when the cup 16 is elevated will cause the retraction of operating arm 70 relative to base 19 as shown in FIG. 4.

Referring now to the X-ray diffraction tube structure 13, it is entirely conventional and comprises an X-ray tube (not shown) and an outer shield defining a window 74 (see FIG. 1) and a spring loaded shutter 75 normally urged into a position at which the shutter closes window 74 to preclude the passage of an X-ray beam. The shutter 75 is withdrawn from the window thus opening it when solenoid 76 is actuated by the closing of limit switch 77 mounted on frame 12. Limit switch 77 is engageable by operating arm 70 for the purpose of closing the limit switch only when the base 19 is in an operative position such as is shown in FIG. 1 and FIG. 5. That is to say, the base 19 must be moved until the adapter 65 which, it will be recalled, may be placed on either the first lower input port 62 or the second upper input port 60, properly couples the selected port to window 74 of the X-ray tube. Thus, operating arm 70 and limit switch 77 cooperate to define a safety interlock which will preclude the passage of an X-ray beam through window 74 whenever base 19 has been moved away from its operative position.

Figure 3:
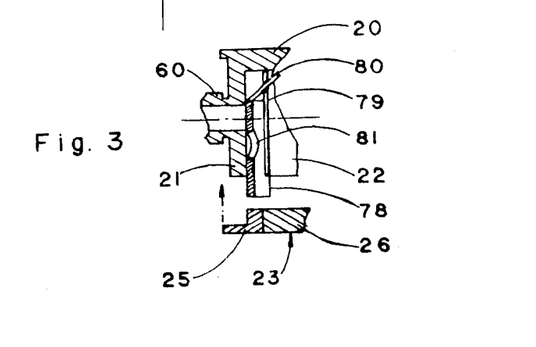
FIG. 3 is a fragmentary view showing the operation of the shield for closing the X-ray input port upon removal of the cover of the specimen chamber.

The first step in utilizing spectro-diffractometer 10 is to gain access to the specimen chamber in order to properly orient specimen holder 35 relative to port 40, and to mount a specimen or analyser crystal in the holder, depending upon the type of study to be carried out. In order to gain access to the specimen chamber 22, thumb screws 24 are loosened, and cover 23 is removed. Upon the removal of cover 23, shield 78, slidably mounted on tracks 79, is urged by leaf spring 80 away from the base 20 closing off and blocking the aperture in the input port 60 as shown in FIG. 3. Shield 78 is provided with an aperture 81 which is aligned with the aperture in port 60 when cover 23 is in place. Thus, shield 78 serves as another safety interlock which will prevent the entry of an X-ray beam into the specimen chamber through the input port 60.

1. Diffraction mode of operation

When a diffraction study is to be carried out, holder 35 and port 40 are positioned, initially, as shown in the solid lines in FIG. 1. If these components are not in the proper relative position after port 40 is driven to its horizontal position with pointer 44 aligned with a base mark (the various gears may have to be loosened in drive 15 to achieve this setting and then retightened), holder 35 can be turned independently of part 40 by normally rotating wheel 30 until the indicia on disc 34 is aligned with a base mark on base 20. A crystal to be investigated can then be mounted on specimen holder 35 as described previously, and a plane of the crystal will be aligned with the axis of input port 60.

Thumb screws 32 then may be loosened to permit the operator to withdraw base 19 from its operative position disengaging rod 70 from limit switch 77 thus causing the solenoid 76 to be deactuated and window 74 to be closed by the shutter 75. No radiation can escape through the window even though the X-ray tube remains operating.

The operator may now utilize thumb screw 30 to vertically position the housing 16 such that the axis of tube 60 is aligned with the axis of window 74. Now, adapter 65 may be placed over the free end of port 60 and the operator may return the base 19 to its operative position at which operating arm 70 can engage limit switch 77, which actuates solenoid 76 allowing shutter 75 to open window 74. With the X-ray tube operating, an X-ray beam will pass axially through port 60 and strike the crystal held in holder 35. At this stage the motor 14 may be energised in the forward direction to drive the output port 40 through approximately 90° as the specimen holder is rotated through approximately 45°. The output of the Geiger counter (not shown) may be recorded on a chart providing a record of the intensity of the reflected radiation as a function of the angular position of the crystal.

2. Fluorescence mode of operation

In order to convert the spectrodiffractometer to its fluorescence mode of operation, the crystal in holder 35 must be replaced with a special analysing crystal and at the same time, holder 35 must be rotated to the position shown in solid lines in FIG. 5. In addition, the specimen being studied must be placed within the depression in specimen holder 63. It should be noted that the two safety interlock features, namely operating arm 70 and limit switch 77 on the one hand, and shield 78 on the other hand are effective in protecting the operator in the event an attempt is made to convert the apparatus from one mode of operation to another while the X-ray beam is operating and X-rays are passing through port 60. As soon as the operator removes cover 23, the shield 78 will be effective to prevent X-rays from entering the specimen chamber. He may then change the crystal in holder 35 and rotate the holder to the desired position for fluorescence analysis.

Having replaced the crystal and properly rotated the holder, the housing 16 must be elevated. In order to accomplish this, thumb screws 32 are loosened, and base 19 is moved from its operative position, permitting adapter to be removed from port 60 and placed on extension 62. Movement of the base from its operative position opens switch 77 and causes shutter 75 to block the window 74. An operator can thus raise the housing 16 without the danger of X-rays escaping through window 74 even though the tube remains in operation.

When the housing 16 is at the proper elevation, as shown in FIGS. 4 and 5, and the adapter 65 is connected to the free end of extension 62, the base 19 may be returned to its operative position thus opening window 74. At this point, the specimen to be studied has not as yet been placed within the depression in specimen holder 63. To gain access to the specimen holder 63, it must be withdrawn from extension 62 by first loosening screw 68 and then pulling the connection 69 in the direction indicated by arrow 100 in FIG. 4. Operating rod 70 will be disengaged from limit switch 77 by such withdrawal of the specimen holder 63 causing shutter 75 to close window 74. Thus, even though the X-ray tube is operating, no X-rays can pass through the extension 62 and escape through the open rear end of this extension and endanger an operator.

After the specimen has been placed within a specimen holder, the operator may return the specimen holder to the extension 62 as shown in FIG. 5 and carry out the fluorescence study on the specimen by energising motor 14 and driving it in the forward direction. When this occurs, holder 35 will be driven through an angle of about 45° while output port 40 will be driven through an angle of approximately 90° permitting the characteristic output of the Geiger counter to be obtained.

Ideally, the distance between the X-ray source and the specimen should be reduced to a minimum when using the lower X-ray port for fluorescence measurements. To achieve this reduction, it may be necessary to modify the operation of arm 70. In addition, it may be desirable to introduce Soller slits between the fluorescence sample and the analyzing crystal.

3. Absorption studies

In order to study the absorption of X-rays by various materials, such materials are first formed into sheets or films mounted on an X-ray transparent substrate. A sheet or film can be placed in slot 46 in tube 41 after the sleeve 47 has been retracted. In this position, the material under investigation will absorb some of the energy in the X-ray beam passing through port 40. Such energy can be selected by properly rotating the holder 35 and port 40 until a peak of the desired energy is reflected from the crystal.

It will be obvious to those skilled in the art that various changes may be made without departing from the scope of the invention and the invention is not to be considered limited to what is shown in the drawings and described in the specification.

We claim:

1. A spectrodiffractometer for performing X-ray diffraction, fluorescence, and absorption analyses using a standard single X-ray diffraction tube, which tube has a shutter-protected window, comprising:

a frame upon which is mounted the X-ray diffraction tube;

a housing defining a specimen chamber within which is rotatably mounted a main specimen/crystal holder, having an axis of rotation, which holds a planar analyzing crystal or planar crystal sample or a powdered sample for reflecting incident X-ray beams;

an output port, connected to a suitable X-ray detecting device, such as a Geiger counter, rotatably mounted on said housing for rotation about said axis of rotation of said specimen/crystal holder, said output port having a longitudinal axis, an extension of which intersects said axis of rotation of said specimen/crystal holder, said incident X-ray beams being reflected by said planar analyzing crystal or planar crystal sample or powdered sample into said output port;

means interconnecting said main specimen/crystal holder and said output port for synchronizing the rotation therebetween so that said output port turns through twice the angle of said specimen/crystal holder;

first and second X-ray input ports mounted on said housing, each of said first and second X-ray input ports having a longitudinal axis, said longitudinal axes of said first and second X-ray input ports being quadrantly located on said housing in the same plane as the plane of rotation of said longitudinal axis of said output port and intersecting at said axis of rotation of said specimen/crystal holder;

a first X-ray input port extension connected to said first X-ray input port and having an auxiliary specimen holder contained therein, said first extension having a longitudinal axis projecting in the same direction as and parallel to said longitudinal axis of said second X-ray input port; and means for mounting said housing on said frame such that said longitudinal axis of either said first X-ray input port extension or said second X-ray port can be positioned in alignment with the incident X-ray beam passing through said shutter protected window of the tube depending on the position of said housing on said frame, thereby converting the spectrodiffractometer from the diffraction mode of operation to the fluorescent mode of operation or vice versa.

2. A spectrodiffractometer according to claim 1, wherein the means interconnecting the main specimen/crystal holder with the output port can be selectively adjusted to change the angular position of the main holder relative to the output port when converting the spectrodiffractometer from the diffraction mode of operation to the flourescent mode or vice versa.

3. A spectrodiffractometer according to claim 1 wherein the means mounting the housing on the frame includes a base horizontally slidable on the frame and a vertical rod attached to the base, and housing being slidably mounted on the rod, and manually adjustable means to selectively fix the housing at either of two different pre-selected heights depending on which input X-ray port is to be aligned with the shutter-protected window of the X-ray diffraction tube.

4. A spectrodiffractometer according to claim 3 wherein the base is slidable on the frame in a direction parallel to the direction of the input X-ray ports and has an operative position at which either one or the other of such ports can be attached to the shutter-protected window of the X-ray diffraction tube, a limit switch operable to remove the shutter from said shutter-protected window, and an operating arm on the base engageable with the limit switch for operating the same only when the base is in an operative position.

5. A spectrodiffractometer according to claim 4, wherein the auxiliary holder is removable from the housing for gaining access thereto, and means are provided interconnecting the auxiliary holder to the operating arm on the base such that removal of the auxiliary holder from the housing when the base is in its operative position serves to disengage the arm from the limit switch and effect closing of the shutter-protected window of the X-ray diffraction tube by the shutter.

6. A spectrodiffractomer according to claim 1 wherein the housing is provided with a removable cover by which access is gained to the specimen chamber, the cover being provided with a lead glass window through which the angular position of the main specimen holder can be observed safely during operation of the apparatus.

7. A spectrodiffractometer according to claim 6 wherein the housing is provided with a movable shield responsive to removal of the cover for blocking the entry of X-rays into the specimen chamber through the second X-ray port.

8. A spectrodiffractometer according to claim 1 wherein the output port is provided with a transverse slot adapted to receive a specimen sheet or film, and a sleeve slidable on the output port for selectively covering and uncovering the slot.

* * * * *